United States Patent
Seo

(10) Patent No.: US 7,680,392 B2
(45) Date of Patent: Mar. 16, 2010

(54) STREAMING CONTENTS RECORDING METHOD OF MOBILE COMMUNICATION TERMINAL

(75) Inventor: Kwang-Deok Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1157 days.

(21) Appl. No.: 10/994,388

(22) Filed: Nov. 23, 2004

(65) Prior Publication Data

US 2005/0114898 A1 May 26, 2005

(30) Foreign Application Priority Data

Nov. 24, 2003 (KR) .................. 10-2003-0083742

(51) Int. Cl.
- H04N 5/91 (2006.01)
- H04N 7/00 (2006.01)
- H04N 7/26 (2006.01)

(52) U.S. Cl. .................. 386/46; 386/95; 386/111; 386/112

(58) Field of Classification Search .............. 386/46, 386/95, 111–112
See application file for complete search history.

(56) References Cited

U.S. PATENT DOCUMENTS

| | | | | |
|---|---|---|---|---|
| 5,828,575 A | * | 10/1998 | Sakai | 700/182 |
| 6,169,843 B1 | * | 1/2001 | Lenihan et al. | 386/46 |
| 6,453,115 B1 | * | 9/2002 | Boyle | 386/68 |
| 2003/0004992 A1 | * | 1/2003 | Matsui et al. | 707/512 |
| 2003/0167472 A1 | * | 9/2003 | Barbanson et al. | 725/131 |

FOREIGN PATENT DOCUMENTS

| | | |
|---|---|---|
| EP | 1 209 884 A2 | 5/2002 |
| JP | 08-116336 | 5/1996 |
| JP | 8-195934 | 7/1996 |
| JP | 09-331495 | 12/1997 |
| JP | 10-271443 | 10/1998 |
| JP | 11-196372 | 7/1999 |
| JP | 2002-281427 | 9/2002 |
| JP | 2003-110992 | 4/2003 |
| JP | 2003-299021 | 10/2003 |
| JP | 2003-333532 | 11/2003 |
| KR | 10-2003-0082791 | 10/2003 |

OTHER PUBLICATIONS

Chinese Office Action dated Dec. 8, 2006.
Japanese Office Action dated Feb. 23, 2007.
Office Action issued by the Korea Intellectual Property Office, 2005.
Japanese Office Action dated Nov. 19, 2007.

* cited by examiner

*Primary Examiner*—Thai Tran
*Assistant Examiner*—Daquan Zhao
(74) *Attorney, Agent, or Firm*—Ked & Associates LLP

(57) ABSTRACT

A streaming contents recording method of a mobile terminal including comparing a length of streaming contents with a remaining memory capacity of the mobile terminal, and recording the streaming contents by omitting a specific frame type if the length of the streaming contents is greater than the memory capacity. Further, the omitted specific frame types include a B-frame type or a B-frame type and a P-frame type.

24 Claims, 3 Drawing Sheets

STREAMING CONTENTS RECORDING METHOD OF MOBILE COMMUNICATION TERMINAL

CROSS-REFERENCE TO A RELATED APPLICATION

This application claims priority to Korean patent application No. 83742/2003 filed on Nov. 24, 2003, the entire contents of which is hereby incorporated in its entirety.

BACKGROUND OF THE INVENTION

1. Field of the Invention

The present invention relates to a streaming contents recording method of a mobile terminal, and more particularly to a streaming contents recording method for controlling and recording a video frame according to a memory capacity of the mobile terminal.

2. Background of the Related Art

In general, when a mobile terminal reproduces streaming contents, the mobile terminal needs a recording function to buffer the corresponding data in a non-volatile memory such as a flash memory.

In a related art streaming service, if a memory capacity is insufficient while streaming contents are being recorded, the audio and video data first accessed are recorded within the limit of the memory capacity. In other words, if an available memory capacity is smaller than the length of the received streaming contents, the audio data and video data greater then the memory capacity are not recorded. Thus, if data critical to reproduction of the streaming contents is positioned at a rear portion of the contents, the corresponding data is not recorded and thus cannot be reproduced.

SUMMARY OF THE INVENTION

Accordingly, one object of the present invention is to address at least the above problems and/or disadvantages and to provide at least the advantages described hereinafter.

Another object of the present invention is to record a video frame after the video frame is reduced according to a remaining memory capacity.

To achieve at least the above objects in whole or in parts, the present invention provides a novel streaming contents recording method of a mobile communication terminal. The method includes comparing a length of streaming contents with a remaining memory capacity of the mobile terminal, and recording the streaming contents by omitting a specific frame type if the length of the streaming contents is greater than the memory capacity. The present invention also provides a novel apparatus for recording streaming contents.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will now be described in detail with reference to the following drawings wherein.

DETAILED DESCRIPTION

A streaming contents recording method according to the present invention will now be described with reference to the accompanying drawings. In general, a compressed digital video is divided into an I (Intrinsic)-frame, a B (Bidirectional)-frame and a P (Prediction)-frame. The I-frame is a reference frame for a motion estimation of a different frame. Thus, the I-frame is independently coded without using a predictive coding method. The P-frame is predictively coded based on the I-frame or a different P-frame. Further, the B-frame is predictively coded based on the I-frame or the P-frame, but cannot be a reference frame of a different frame in the predictive coding method. Thus, according to the present invention, B-frames are omitted, if required, because B-frames do not affect decoding of the I-frame and the P-frame.

Therefore, the amount of video data can be reduced without affecting coding of the other frames. Further, because a frame rate is reduced when B-frames are omitted, a picture quality may deteriorate at a portion where an image is actively moved. However, it is preferable the picture quality be slightly reduced verses not receiving a portion of the streaming data based on a limited memory capacity. Further, the amount of overall data that can be obtained by omitting B-frames increases. In addition, if the shortage of memory capacity is still not resolved by omitting the B-frame, the P-frame can also be omitted. In this instance, only the I-frame is recorded.

Further, according to the present invention, a UDTA (User Data Atom) positioned at a header of an MP4 contents file may be used to process the data. In more detail, the UDTA is a portion where a user can store information to be transmitted or information for a supplementary purpose. The supplementary information may include, for example, at least one of 1), 2) and 3) and at least one of 4), 5) and 6) as follows.

1) the length of the contents of the video stream with the B-frame omitted;

2) a bit rate of the video bit stream with the B-frame omitted;

3) a video frame rate with the B-frame omitted;

4) the length of contents of the video stream with the B-frame and the P-frame omitted;

5) a bit rate of the video bit stream with the B-frame and the P-frame omitted; and 6) a video frame rate with the B-frame and the P-frame omitted.

Thus, the supplementary information contained in the UDTA may be used as a reference to determine whether to omit the B-frame or whether to omit both the B-frame and the P-frame based on a remaining memory capacity of the mobile terminal.

Figure 1:
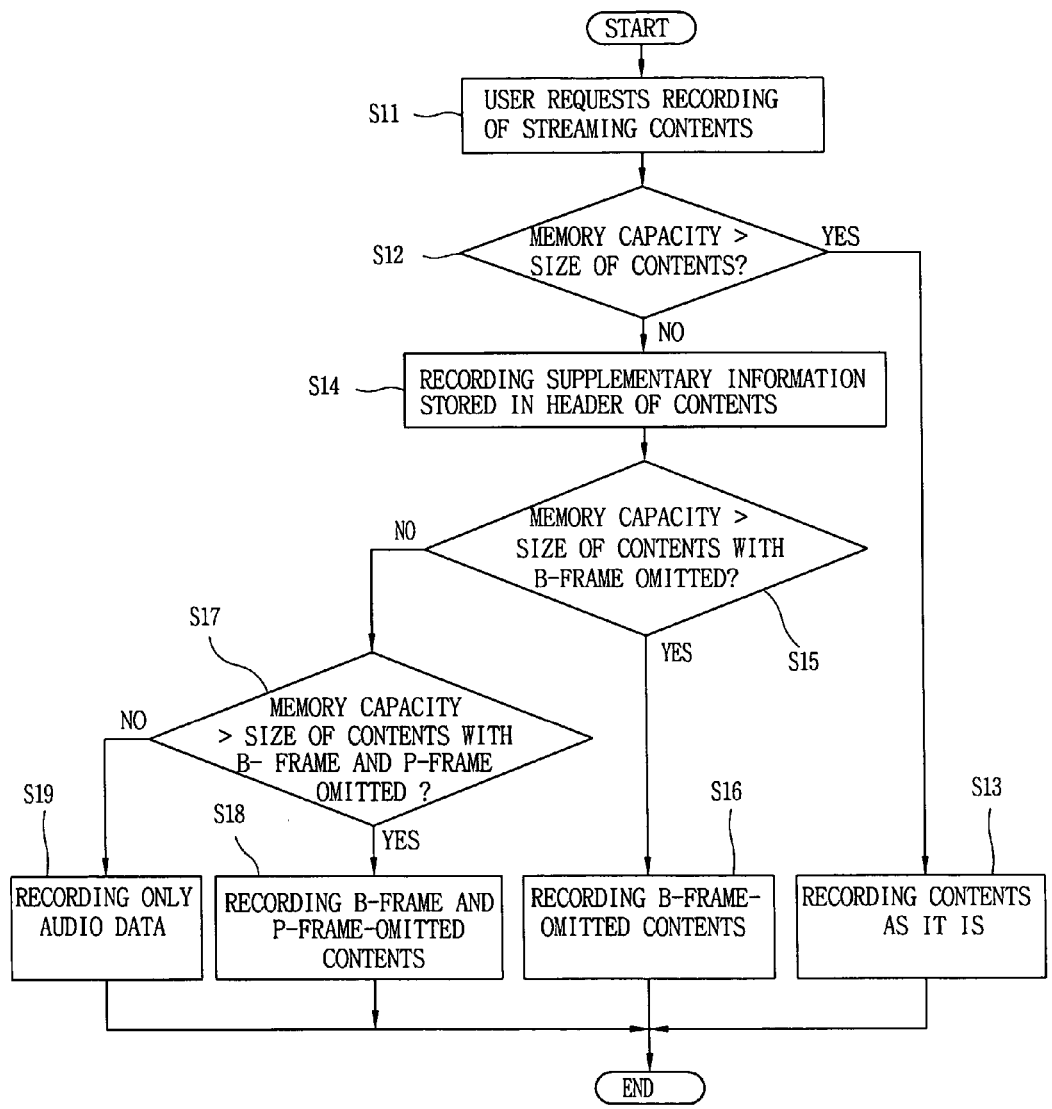
FIG. 1 is a flowchart of a streaming contents recording method of a mobile terminal according to the present invention.

Turning now to FIG. 1, which is a flowchart of a streaming contents recording method of a mobile terminal according to the present invention. As shown, when the user requests the streaming contents be recorded (step S11), the mobile terminal compares a remaining memory capacity and a length of the streaming contents (step S12). If the memory capacity is greater than the streaming contents, the streaming contents are immediately recorded (step S13).

If, however, the memory capacity is smaller than the streaming contents, the supplementary information stored in the UDTA is searched (step S14). That is, the supplementary information may be used to determined the length of the content with the B-frames omitted (item 1 above). In this example, the length of the contents with the B-frames omitted is compared with the current memory capacity (S15).

Next, in step S15, if the current memory capacity of the terminal is greater than the length of the contents with the B-frame omitted, the B-frames of the received streaming contents are omitted, and the streaming contents are recorded in consideration of a corresponding bit rate and frame rate (step S16).

However, if the current remaining memory capacity is less than the length of the contents with the B-frames omitted, the length of the contents with both of the B-frames and the P-frames omitted included in the supplementary information is examined and compared with the remaining memory capacity (step S17).

If the remaining memory capacity is greater than the length of the contents with both of the B-frames and the P-frames omitted, the B-frames and the P-frames are omitted and the streaming contents are recorded in consideration of a corresponding bit rate and the frame rate (step S18).

However, if the remaining memory capacity is smaller than the length of the contents with the B-frames and the P-frames omitted, the entire video data of the received streaming contents is omitted and only the audio data is recorded (step S19). That is, because audio data is generally more significant than video data, the audio data is preferably recorded even if a memory capacity is insufficient. However, in the related art, a priority for the importance of the audio data was not considered. In addition, if the memory capacity is too small to record all of the audio data, the audio data is recorded based on a limitation of the remaining memory capacity.

Figure 2:
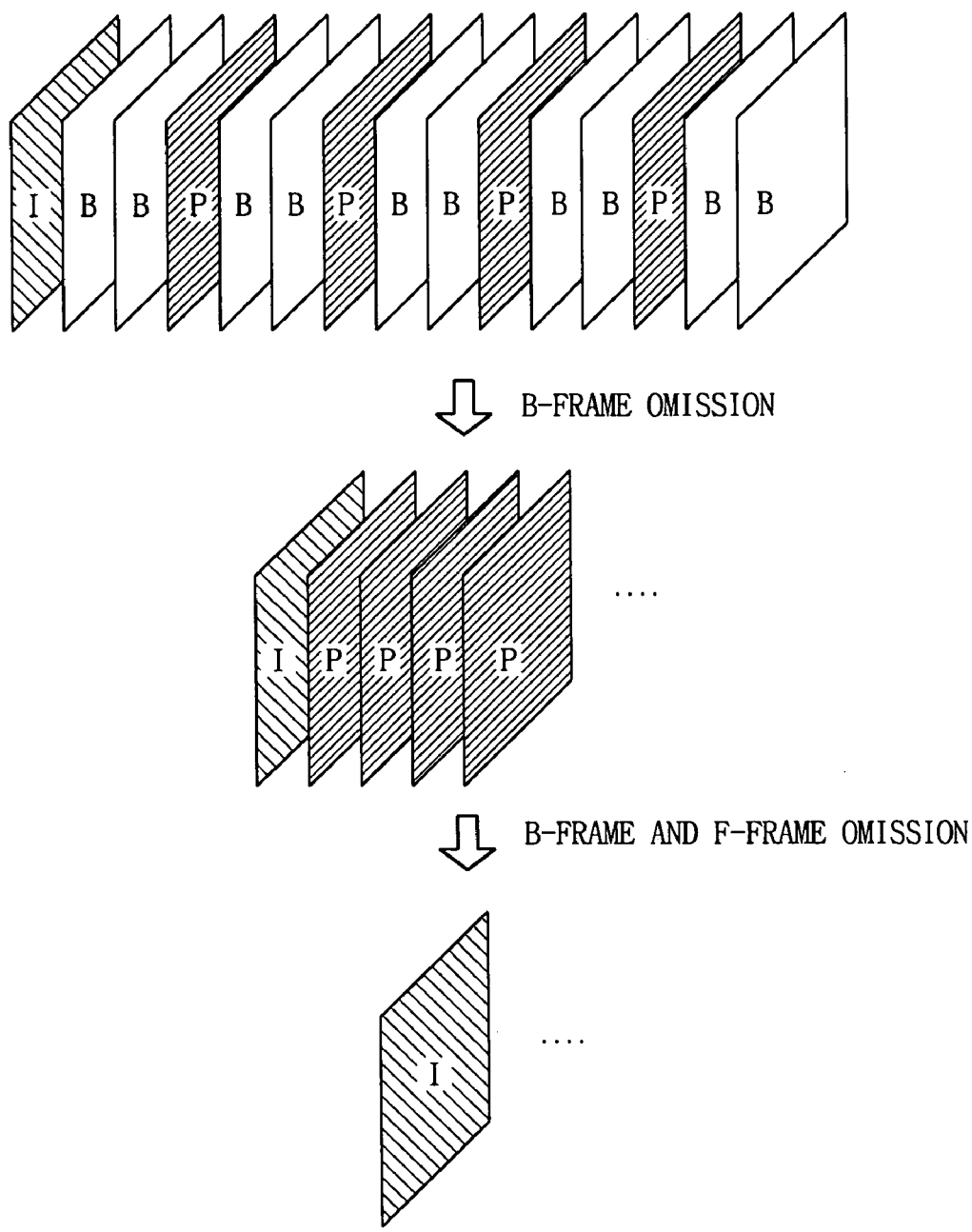
FIG. 2 is an overview illustrating removal of certain frame types according to the present invention.

Next, FIG. 2 is an overview illustrating video data with I-frames, B-frames and P-frames, video data with the B-frames omitted, and video data with both of the B-frames and the P-frames omitted. As shown, if all the B-frames are omitted from the video data having the from the frames 'IBBPBBPBBPBBPBB . . . ' shown in FIG. 2, the remaining video data has the frames 'IPPPP . . . ', thereby reducing the frame rate by ⅓ and the amount of data by about 20%~30%.

In other words, when the memory capacity of the mobile terminal is about 20%~30% less than the length of the streaming contents, all of the audio data can be recorded by omitting the B-frame. Further, as for the video data, all of the I-frame and the P-frame can be recorded.

However, if the memory capacity of the mobile terminal is more than 30% less than the required, for example, the P-frame can also be omitted. In this instance, only the I-frame is recorded.

Further, the above-described process of omitting the B-frames or the P-frames is performed when the streaming contents are recorded by the mobile communication terminal. That is, when the streaming contents are originally transmitted, the B-frames and the P-frames are not omitted.

Further, the memory capacity of the mobile terminal is preferably continuously monitored. Also, the overall length of streaming contents can be determined, and the lengths of the contents without the B-frames and P-frames as discussed above can be read from the UDTA, for example.

Figure 3:
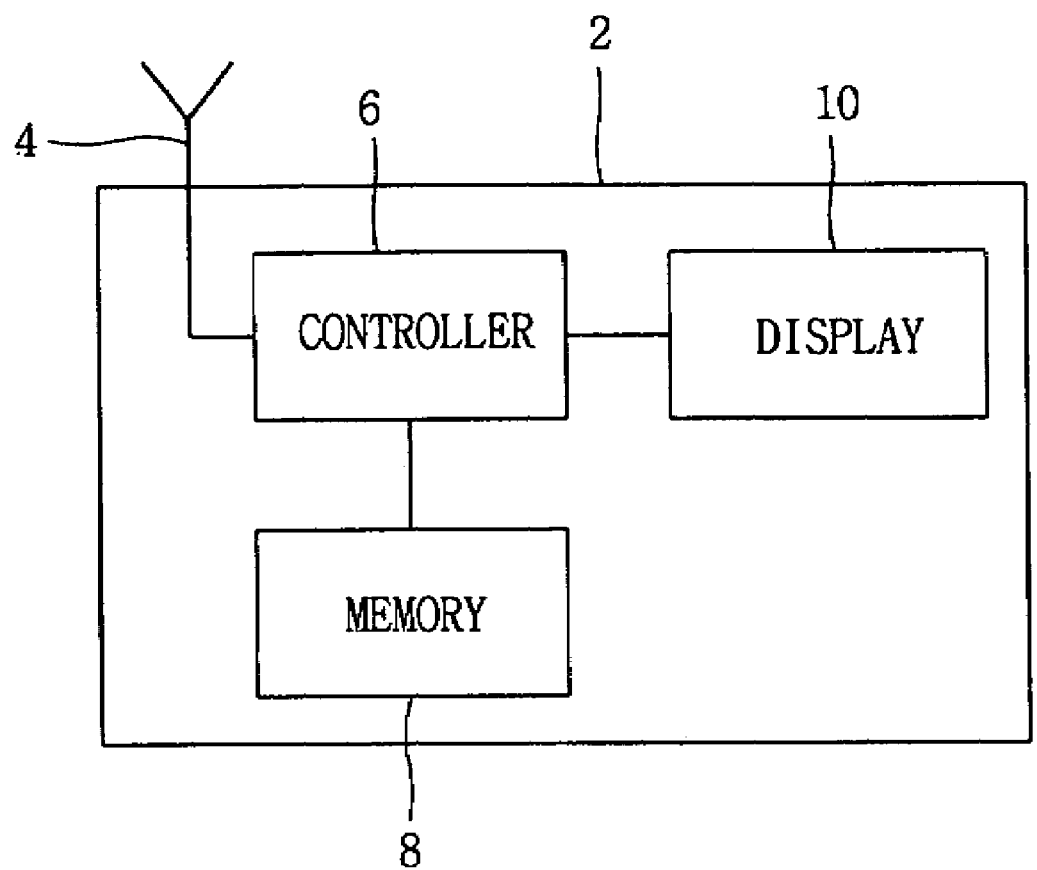
FIG. 3 is a block diagram of a mobile terminal according to the present invention.

Turning now to FIG. 3, which is a block diagram of a mobile terminal 2 for recording streaming contents as discussed above. As shown, the mobile terminal 2 includes an antenna 4, a controller 6 (e.g., a CPU), a memory 8 and a display 10. The memory 8 stores the streaming contents, and the controller 6 compares a length of the streaming contents with a remaining capacity of the memory 8, and records the streaming contents by omitting a specific frame type if the length of the streaming contents is greater than the capacity of the memory 8.

Further, the streaming contents includes information corresponding to at least one from the length of the contents, a bit rate of the contents and a video frame rate of the contents for the omitted specific frame type. As noted above, the information is included in a header of the streaming contents based on a result of the comparison of the length with the remaining memory capacity streaming contents. In addition, the controller 6 determines the specific frame type to be omitted based on a result of the comparison of the length with the remaining memory capacity, and records frames that have not been omitted in the memory 8 of the mobile terminal. The controller 6 also records the streaming contents without omitting the specific frame type if the length of the streaming contents is smaller than the remaining memory capacity. Further, the controller 6 records only audio data included in the streaming contents if the memory capacity is smaller than a length of the streaming contents with the B-frame and P-frame types being omitted.

Alternatively, the controller 6 compares a length of streaming contents with a remaining capacity of the memory, prioritizer frame types of the streaming contents based on affect a frame type has on a decoding process, and records the streaming contents by omitting a specific frame type having a least affect on the decoding process if the length of the streaming contents is greater than the remaining capacity of the memory.

As so far described, the streaming contents recording method of a mobile communication terminal according to the present invention has the following advantages.

First, because a quality of video data is controlled according to a remaining memory capacity of a mobile terminal even though important information may be positioned at a rear portion of the streaming contents, the information can be still recorded.

Second, because a priority is attributed to audio data, even if a memory capacity is not sufficient, the audio data can be entirely recorded. Thus, the mobile communication terminal implements a streaming service effectively.

Third, because the B-frame or the B-frame and the P-frame having less effect on restoration are omitted from the streaming contents according to the memory capacity, a restored image can be recorded with a uniform bit rate and frame rate.

Fourth, because streaming contents are recorded based on the remaining memory capacity, the efficiency of a memory is improved.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art. The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A streaming contents recording method of a mobile terminal comprising:
    comparing a length of streaming contents corresponding to an MP4 contents file with a remaining memory capacity of the mobile terminal, said comparing including acquiring supplementary information from a user data atom included in a header of the streaming contents and determining one or more frame types to be omitted based on the supplementary information and the remaining memory capacity of the mobile terminal; and
    recording the streaming contents by omitting said one or more frame types if the length of the streaming contents is greater than the memory capacity, wherein:
    the frame types include I, B, and P frame types,
    the supplementary information includes first information indicating a length of the streaming contents with B frames omitted and second information indicating a length of the streaming contents with B and P frames omitted, and
    said recording includes recording only I and P frames of the streaming contents based on the first information or recording only I frames of the steaming contents based on the second information, wherein said comparing is performed by a controller.

2. The method of claim 1, wherein the first information indicates at least one of a length of the streaming contents with B frames omitted, a bit rate of the streaming contents with B frames omitted, or a video frame rate of the streaming contents with B frames omitted, and, and
    wherein the second information indicates at least one of a length of the streaming contents with B and P frames omitted, a bit rate of the steaming contents with B and P frames omitted, or a video frame rate of the streaming contents with B and P frames omitted.

3. The method of claim 1, further comprising:
    recording the streaming contents without omitting any of the I, B, or P type frames if the length of the streaming contents is smaller than the remaining memory capacity.

4. The method of claim 1, further comprising:
    recording audio data included in the streaming contents without any video data if the remaining memory capacity is smaller than the length of the streaming contents with the B-frame and P-frame types being omitted as indicated by the second information.

5. The method of claim 1, wherein the B-frame type is predictively coded based on a reference frame or the P-frame type, and the P-frame type is predictively coded based on a reference frame or another reference frame.

6. A mobile terminal comprising:
    a memory configured to store steaming contents corresponding to an MP4 contents file; and
    a controller configured to compare a length of streaming contents with a remaining capacity of the memory, and to record the streaming contents by omitting at least one specific frame type if the length of the steaming contents is greater than the remaining capacity of the memory, wherein the controller performs said comparison by:
    acquiring supplementary information from a user data atom included in a header of the steaming contents, and
    determining one or more frame types to be omitted based on the supplementary information and the remaining memory capacity of the mobile terminal,
    wherein the frame types include I, B, and P frame types and the supplementary information includes first information indicating a length of the steaming contents with B frames omitted and second information indicating a length of the streaming contents with B and P frames omitted, and
    wherein the controller records only I and P frames of the streaming contents based on the first information or records only I frames of the streaming contents based on the second information.

7. The terminal of claim 6, wherein the first information indicates at least one of a length of the streaming contents with B frames omitted, a bit rate of the streaming contents with B frames omitted, or a video frame rate of the streaming contents with B frames omitted, and
    wherein the second information indicates at least one of a length of the streaming contents with B and P frames omitted, a bit rate of the steaming contents with B and P frames omitted, or a video frame rate of the streaming contents with B and P frames omitted.

8. The terminal of claim 6, wherein the controller records the steaming contents without omitting any of the I, B, or P frame types if the length of the streaming contents is smaller than the remaining memory capacity.

9. The terminal of claim 6, wherein the controller records audio data included in the streaming contents without any video data if the remaining memory capacity is smaller than the length of the streaming contents with the B-frame and P-frame types being omitted as indicated by the second information.

10. The terminal of claim 6, wherein the B-frame type is predictively coded based on a reference frame or the P-frame type, and the P-frame type is predictively coded based on a reference frame or another reference frame.

11. A streaming contents recording method of a mobile terminal comprising:
    comparing a length of streaming contents corresponding to an MP4 contents file with a remaining memory capacity of the mobile terminal;
    prioritizing frame types of the steaming contents based on an affect a frame type has on a decoding process; and
    recording the streaming contents by omitting a specific frame type having a least affect on the decoding process if the length of the streaming contents is greater than the memory capacity, wherein said comparing includes acquiring supplementary information from a user data atom included in a header of the streaming contents and determining one or more frame types to be omitted based on the supplementary information and the remaining memory capacity of the mobile terminal, said frame types including I, P, and B frame types,
    wherein said supplementary information including first information indicating a length of the steaming contents with B frames omitted and second information indicating a length of the streaming contents with B and P francs omitted, and
    wherein said recording includes recording only I and P frames of the streaming contents based on the first information or recording only I frames of the streaming contents based on the second information, wherein at least one of said comparing and prioritizing is performed by a controller.

12. The method of claim 11, wherein the first information indicates at least one of a length of the steaming contents with B frames omitted, a bit rate of the streaming contents with B frames omitted, or a video frame rate of the streaming contents with B frames omitted, and
wherein the second information indicates at least one of a length of the streaming contents with B and P frames omitted, a bit rate of the streaming contents with B and P frames omitted, or a video frame rate of the steaming contents with B and P frames omitted.

13. The method of claim 11, wherein recording the streaming comments further comprises: recording frames that have not been omitted in a memory of the mobile terminal.

14. The method of claim 11, further comprising:
recording the streaming contents without omitting any of the I, B, or P frame types if the length of the steaming contents is smaller than the remaining memory capacity.

15. The method of claim 11, further comprising:
recording audio data included in the streaming contents without any video data if the remaining memory capacity is smaller than the length of the steaming contents with the B-frame and P-frame types being omitted as indicated by the second information.

16. The method of claim 11, wherein the B-frame type is predictively coded based on a reference frame or the P-frame type, and the P-frame type is predictively coded based on a reference frame or another reference frame.

17. The method of claim 11, wherein the B-frame type has the least affect on the decoding process and the P-frame has the next least affect on the decoding process.

18. A mobile terminal comprising:
a memory configured to store streaming contents corresponding to an MP4 contents file; and
a controller configured to compare a length of steaming contents with a remaining capacity of the memory, to prioritize frame types of the streaming contents based on affect a frame type has on a decoding process, and to record the streaming contents by omitting at least one specific frame type having a least affect on the decoding process if the length of the streaming contents is greater than the remaining capacity of the memory, wherein the controller performs said comparison by:

acquiring supplementary information from a user data atom included in a header of the steaming contents, and
determining one or more frame types to be omitted based on the supplementary information and the remaining memory capacity of the mobile terminal,
wherein the frame types include I, B, and P frame types and the supplementary information includes first information indicating a length of the streaming contents with B frames omitted and second information indicating a length of the streaming contents with B and P frames omitted, and
wherein the controller records only I and P frames of the streaming contents based on the first information or records only I frames of the streaming contents based on the second information.

19. The terminal of claim 18, wherein the first information indicates at least one of a length of the streaming contents with B frames omitted, a bit rate of the streaming contents with B frames omitted, or a video frame rate of the streaming contents with B frames omitted, and
wherein the second information indicates at least one of a length of the streaming contents with B and P frames omitted, a bit rate of the streaming contents with B and P frames omitted, or a video frame rate of the streaming contents with B and P frames omitted.

20. The terminal of claim 18, wherein the controller records frames that have not been omitted in a memory of the mobile terminal.

21. The terminal of claim 18, wherein the controller records the streaming contents without omitting any of the I, B, or P frame types if the length of the streaming contents is smaller than the remaining memory capacity.

22. The terminal of claim 18, wherein the controller records audio data included in the streaming contents without any video data if the memory capacity is smaller than a length of the streaming contents with the B-frame and P-frame types being omitted.

23. The terminal of claim 18, wherein the B-frame type is predictively coded based on a reference frame or the P-frame type, and the P-frame type is predictively coded based on a reference frame or another reference frame.

24. The terminal of claim 18, wherein the B-frame type has the least affect on the decoding process and the P-frame has the next least affect on the decoding process.

* * * * *